(12) United States Patent
Schlager

(10) Patent No.: US 11,339,854 B2
(45) Date of Patent: May 24, 2022

(54) CHAIN DRIVEN E-DRIVE GEARBOX

(71) Applicant: MAGNA INTERNATIONAL INC., Aurora (CA)

(72) Inventor: Gerd Schlager, Kefermarkt (AT)

(73) Assignee: MAGNA INTERNATIONAL INC., Aurora (CA)

( * ) Notice: Subject to any disclaimer, the term of this patent is extended or adjusted under 35 U.S.C. 154(b) by 0 days.

(21) Appl. No.: 17/048,727

(22) PCT Filed: Apr. 18, 2019

(86) PCT No.: PCT/CA2019/000050
§ 371 (c)(1),
(2) Date: Oct. 19, 2020

(87) PCT Pub. No.: WO2019/200454
PCT Pub. Date: Oct. 24, 2019

(65) Prior Publication Data
US 2021/0246972 A1   Aug. 12, 2021

Related U.S. Application Data

(60) Provisional application No. 62/660,482, filed on Apr. 20, 2018.

(51) Int. Cl.
*B60K 1/00* (2006.01)
*F16H 7/06* (2006.01)
(Continued)

(52) U.S. Cl.
CPC .................. *F16H 7/06* (2013.01); *B60K 1/00* (2013.01); *B60K 17/04* (2013.01);
(Continued)

(58) Field of Classification Search
CPC .... F16H 7/06; F16H 37/0813; F16H 63/3416; F16H 55/06; F16H 2057/02052;
(Continued)

(56) References Cited

U.S. PATENT DOCUMENTS 1,097,546 A   5/1914   Harley
3,861,485 A   1/1975   Busch
(Continued)

FOREIGN PATENT DOCUMENTS

DE   102010004222 A1 *  7/2010   ......... F16H 57/0447
EP       2819277 A1 * 12/2014   ............. H02K 7/083
(Continued)

OTHER PUBLICATIONS

International Search Report corresponding to PCT/CA2019/000050 dated Jul. 4, 2019.

*Primary Examiner* — Justin Holmes
(74) *Attorney, Agent, or Firm* — Dickinson Wright PLLC

(57) ABSTRACT

An electric drive module (e-drive module) for an electric motor vehicle and chain driven electric-drive (e-drive) gearbox therefor is provided. The e-drive gearbox has first and second chain members operably coupling an output shaft of an electric motor to a shaft of a driven output member. A first drive gear is rotatable with the output shaft of the electric motor. A first driven gear is coupled to the first drive gear via the first chain member. A second driven gear is coupled to the first driven gear via a common shaft and co-rotatable with the first driven gear. A second drive gear is coupled to the second driven gear via the second chain member. The respective rotational axes of the first and second drive gears and the first and second driven gears are parallel to each other.

18 Claims, 3 Drawing Sheets

(51) Int. Cl.
*B60K 17/04* (2006.01)
*F16H 37/08* (2006.01)
*F16H 55/06* (2006.01)
*F16H 63/34* (2006.01)
*F16H 57/02* (2012.01)

(52) U.S. Cl.
CPC .... *F16H 37/0813* (2013.01); *B60K 2001/001* (2013.01); *F16H 55/06* (2013.01); *F16H 63/3416* (2013.01); *F16H 2057/02034* (2013.01); *F16H 2057/02052* (2013.01); *F16H 2702/02* (2013.01)

(58) Field of Classification Search
CPC ....... F16H 2702/02; F16H 2057/02034; B60K 17/04; B60K 1/00; B60K 2001/001
See application file for complete search history.

(56) References Cited

U.S. PATENT DOCUMENTS

| | | | |
|---|---|---|---|
| 4,393,954 A | 7/1983 | Soucy et al. | |
| 5,242,028 A | 9/1993 | Murphy et al. | |
| 8,968,137 B2 | 3/2015 | Bausch et al. | |
| 2012/0247269 A1* | 10/2012 | Horie | H02K 7/006 74/665 L |
| 2014/0135169 A1 | 5/2014 | Rossey et al. | |
| 2016/0102752 A1* | 4/2016 | Yelvington | B62K 11/04 475/269 |
| 2017/0057349 A1* | 3/2017 | Ogawa | F16H 57/037 |
| 2018/0010491 A1* | 1/2018 | Yamahata | B60K 6/383 |
| 2019/0248244 A1* | 8/2019 | Gayney | F16H 7/06 |

FOREIGN PATENT DOCUMENTS

| | | | |
|---|---|---|---|
| WO | 2005039964 A1 | 5/2005 | |
| WO | 2011013109 A1 | 2/2011 | |
| WO | WO-2012007030 A1 * | 1/2012 | ............... B60K 1/00 |

* cited by examiner

CHAIN DRIVEN E-DRIVE GEARBOX

CROSS-REFERENCE TO RELATED APPLICATIONS

This application is a U.S. National Stage of International Application No. PCT/CA2019/000050, filed on Apr. 18, 2019, which claims the benefit of U.S. Provisional Patent Application No. 62/660,482, filed Apr. 20, 2018 and titled "Chain Driven e-Drive Gearbox," which is hereby incorporated by reference in its entirety.

FIELD

The present disclosure relates generally to vehicles that are powered at least partly by an electric drive module and, more particularly, to an electric drive module having chain driven shafts.

BACKGROUND

This section provides background information related to vehicles and is not necessarily prior art to the inventive concepts associated with the present disclosure.

The automobile industry is actively working to develop alternative powertrains in an effort to significantly reduce or eliminate the emissions exhausted into the air by conventional powertrains equipped with an internal combustion engine. Significant development has been directed toward electric vehicles (EV) that are equipped with one or more electric traction motors. For example, some electric vehicles are only powered by the electric motor(s) and rely solely on the electrical energy stored in an on-board battery pack. However, some other electric vehicles, commonly referred to as hybrid electric vehicles (HEV), have both an internal combustion engine and one or more traction motors.

There are two types of hybrid electric vehicles, namely, series hybrid and parallel hybrid. In series hybrid electric vehicles, tractive power is generated and delivered to the wheels by the electric traction motor(s) while the internal combustion engine is used to drive a generator for charging the battery pack. In parallel hybrid electric vehicles, the traction motor(s) and the internal combustion engine work independently or in combination to generate and deliver tractive power to the wheels.

Various types of electric and hybrid powertrain arrangements are currently being developed. For example, some electric vehicles are equipped with wheel-mounted electric traction motor/gearbox assemblies. In such an arrangement, a fixed-ratio gear reduction is provided between the traction motor and the driven wheel hub. In other arrangements, an electric drive module (EDM) is used to generate and deliver tractive power to a pair of wheels. The electric drive module may include an electric traction motor, a final drive assembly including a differential unit that is adapted for connection to the wheels, and a gearbox having a reduction gearset directly coupling an output component of the traction motor to an input component of the differential unit. The gearbox reduction gearset may be based on a layshaft configuration or a planetary configuration for the purpose of providing a desired speed reduction and torque multiplication between the traction motor and the differential unit. Although reduction gearsets are generally effective for interconnecting input and output shafts for the transfer of torque therebetween, they can suffer performance inefficiencies, inherently add weight to the vehicle, which ultimately affects fuel efficiency, are subject to noise and vibration, generally include helical gears which produce axial forces that require bearings of increased load carrying capacity and lubrication flow, and require increased space, thereby increasing the size of the module.

In view of the above, there remains a need to develop a gearbox for an e-drive module that addresses and overcomes at least those disadvantages discussed above.

SUMMARY

This section provides a general summary of the present disclosure and is not a comprehensive disclosure of its full scope or all of its features, aspects and objectives.

It is an aspect of the present disclosure to provide an e-drive system having a chain driven e-drive gearbox for a motor vehicle that increases the peak efficiency transfer of torque between an input shaft and an output shaft.

It is an aspect of the present disclosure to provide a chain driven e-drive gearbox for a motor vehicle that eliminates or substantially eliminates the production of axial forces, thereby eliminating or substantially eliminating torque dependent axial forces on bearings and on a housing of the e-drive system.

It is an aspect of the present disclosure to provide a chain driven e-drive gearbox for a motor vehicle that reduces the axial preload of rotating members within the e-drive system, thereby avoiding temperature dependent behavior a bearings within the e-drive system, and thus, increasing the operating efficiency of the e-drive system.

It is an aspect of the present disclosure to provide a chain driven e-drive gearbox for a motor vehicle that produces an oil pump mechanism within the system via rotating chains interconnecting gears within the system, thereby realizing a dry sump arrangement having a dedicated, translation activated oil catcher.

It is a further aspect of the present disclosure to provide a chain driven e-drive gearbox for a motor vehicle that has minimal size and weight, that enhances the fuel efficiency of a vehicle, that produces minimal noise and vibration, that reduces the size and load carrying capacity of bearings required within the gearbox, and that produces a transmission ratio that is greater than 3.

Based on these and other aspects and objectives of the present disclosure, an electric drive module (e-drive module) for an electric motor vehicle is provided, wherein the e-drive module includes a chain driven electric-drive gearbox having first and second chain members operably coupling an output shaft of an electric motor to a drive shaft of a driven output member, such as a differential.

In one aspect, an electric drive module for an electric motor vehicle is provided. The module includes a housing defining a chamber; an electric motor disposed in the chamber, the electric motor having an output shaft; a first drive gear operably driven by the output shaft; a first driven gear and a second driven gear supported for co-rotation on a shaft; a second drive gear supported for rotation on a drive shaft; a first chain member operably coupling the first drive gear to the first driven gear to cause the first driven gear to rotate in response to rotation of the first drive gear; and a second chain member operably coupling the second driven gear to the second drive gear to cause the second drive gear to rotate in response to rotation of the second driven gear.

In another aspect, a method of operating an electric drive module is provided. The method includes the steps of: operating an electric motor and rotating a first drive gear coupled to an output shaft associated with the electric motor; in response to rotating the first drive gear, translating a first chain member coupled to the first drive gear; in response to translating the first chain member, rotating a first driven gear coupled to the first chain member; in response to rotating the first driven gear, rotating a second driven gear, wherein the second driven gear is supported on a common shaft with the first driven gear; in response to rotating the second driven gear, translating a second chain member; in response to translating the second chain member, rotating a second drive gear and a driveshaft coupled thereto.

In yet another aspect, an electronic drive module system is provided. The system includes: an electric motor having an output shaft; a first drive gear coupled to the output shaft and rotatable with the output shaft; a first driven gear coupled to the first drive gear via a first chain member, wherein the first driven gear is larger than the first drive gear; a second driven gear coupled to the first driven gear via a common shaft, wherein the second driven gear is smaller than the first driven gear and the first and second driven gears are co-rotatable; a second drive gear coupled to the second driven gear via a second chain member; and a driveshaft coupled to the second drive gear and rotatable with the second drive gear.

BRIEF DESCRIPTION OF THE DRAWINGS

These and other aspects, features, and advantages of the present disclosure will be readily appreciated, as the same becomes better understood by reference to the following detailed description when considered in connection with the accompanying drawings wherein.

DETAILED DESCRIPTION OF EXAMPLE EMBODIMENTS

Figure 1:
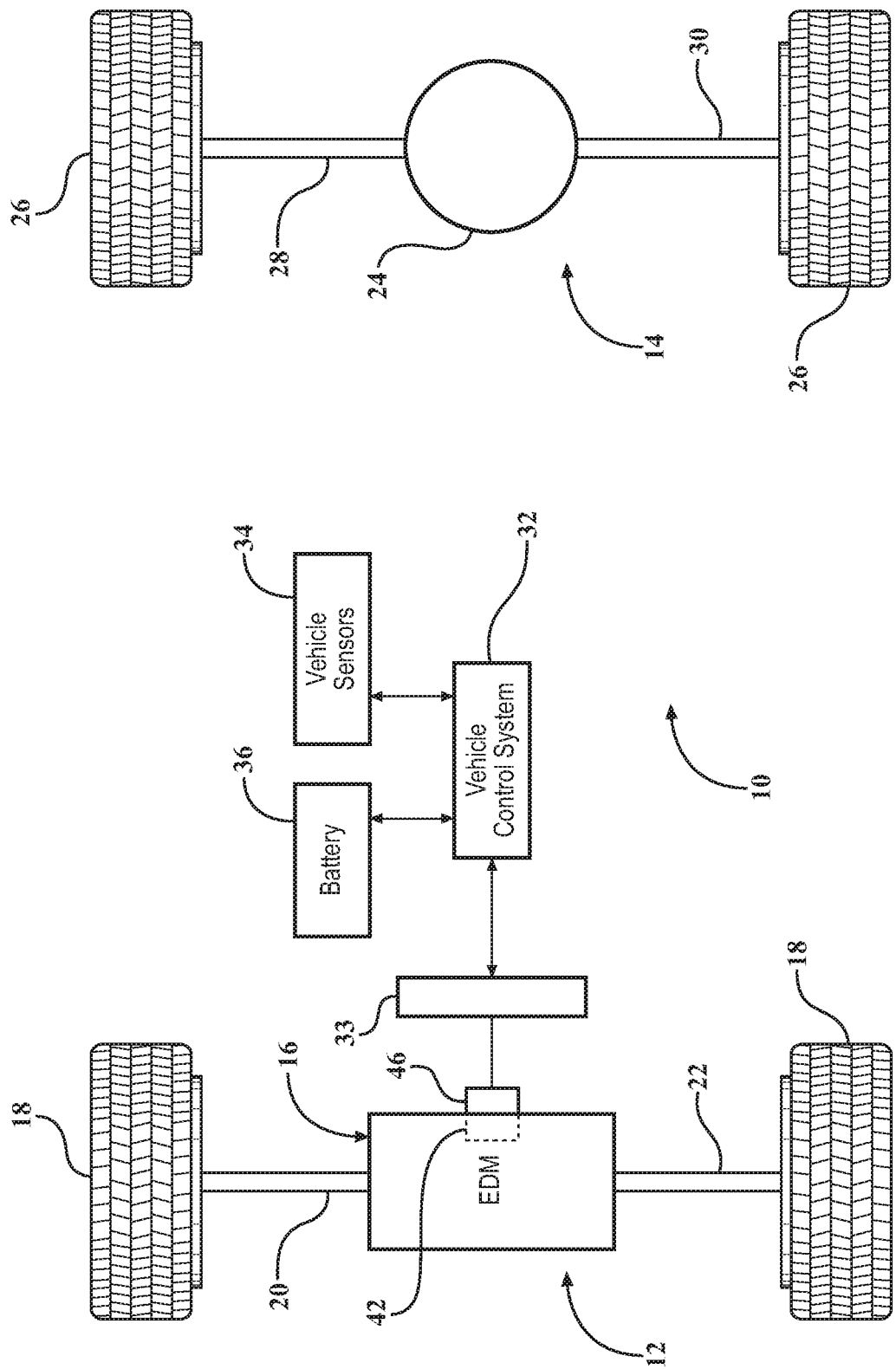
FIG. 1 is a schematic illustration of a powertrain and control system associated with an electric vehicle equipped with an electric drive module constructed in accordance with one aspect the present disclosure.

An example embodiment of a chain driven e-drive gearbox for use in a motor vehicle will now be described more fully with reference to the accompanying drawings. To this end, the example embodiment of the e-drive gearbox is provided so that this disclosure will be thorough, and will fully convey its intended scope to those who are skilled in the art. Accordingly, numerous specific details are set forth such as examples of specific components, devices, and methods, to provide a thorough understanding of a particular embodiment of the present disclosure. However, it will be apparent to those skilled in the art that specific details need not be employed, that the example embodiment may be embodied in many different forms, and that the example embodiment should not be construed to limit the scope of the present disclosure. In some parts of the example embodiment, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Referring initially to FIG. 1 of the drawings, an exemplary powertrain arrangement for an electric vehicle 10 is shown to include a first powered driveline assembly 12 and a second non-powered driveline assembly 14. As shown in FIG. 1, the first driveline assembly 12 may include an electric drive module (EDM) 16, which is operatively coupled to drive or be driven by a pair of first ground-engaging wheels 18 via a pair of first axleshafts 20 and 22. Accordingly, actuation of the EDM 16 will operate to drive the wheels 18 by rotating one or both of the axleshafts 20, 22.

Second driveline assembly 14 may include an axle assembly having a differential unit 24 operatively coupled to a pair of second ground-engaging wheels 26 via a pair of second axleshafts 28 and 30. Accordingly, rotation of the axleshafts 28 and 30 will cause rotating of the wheels 26.

In accordance with the present teachings, powered driveline assembly 12 may be arranged as either the front or rear driveline of the electric vehicle 10. Electric vehicle 10 is also shown to include a vehicle control system 32 configured in operable communication with EDM 16 via a power electronics unit 33, a set of vehicle sensors 34 and an energy (i.e., battery) management system 36. Signals received at the control system 32 from the sensors 34, or other signals received or generated at the control system 32, may be processed by the control system 32, which may in turn provide one or more commands to the electronics unit 33, which will ultimately control the EDM 16.

Figure 2:
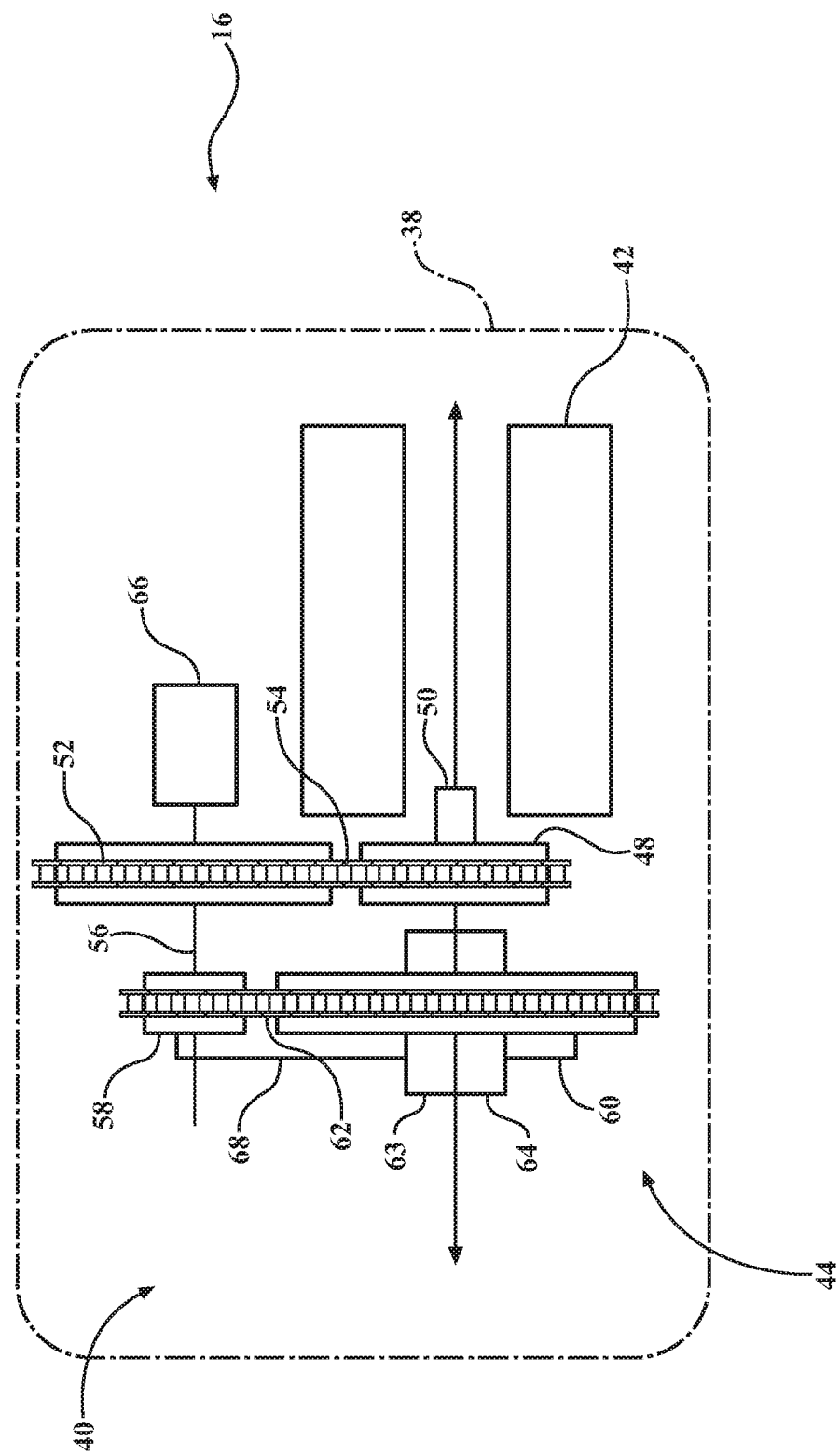
FIG. 2 is a schematic illustration of a chain driven electric-drive gearbox of the electric drive module of FIG. 1.

Referring now to FIG. 2, an exemplary construction for electric drive module 16 of FIG. 1 is shown. In general, EDM 16 includes a housing 38, such a multi-piece housing, by way of example and without limitation, configured to define an internal motor/gearbox chamber 40. The chamber 40 is configured to house a variety of internal components for the EDM 16, with the housing 38 configured to cover and protect the internal components from environmental factors. EDM 16 further includes at least one electric gearbox motor 42 and a chain driven e-drive gearbox assembly, referred to hereafter as gearbox 44, operably driven thereby, each of which is disposed within chamber 40.

Referring again to FIG. 1 in association with FIG. 2, the power electronics unit 33 is shown in electrical communication with a control module 46, which is electrically connected to electric motor 42. Power electronics unit 33 can include, for example and without limitation, a triple inverter-controller unit that is arranged to communicate with vehicle control system 32 and supply the desired electrical command signals to each of the respective motor control modules. As will be understood, the specific configuration of the control circuits, systems and algorithms required to coordinate operation of EDM 16 can include any control systems adapted for use with electric vehicles. Accordingly, control system 32 and electronics unit 33 may combine to command the control module 46 of the EDM 16 to operate the electric motor 42.

Referring again to FIG. 2, gearbox 44 includes a first drive gear 48 driven by an output shaft 50 of electric motor 42. First drive gear 48 can be provided as a metal or plastic member. Operation of the electric motor 42, and in particular a rotation of the rotor portion of a rotor-stator arrangement, may thereby cause rotation of the output shaft 50 and rotation of the first drive gear 48.

First drive gear 48 is operably connected with a first driven reduction gear 52 via a first chain member 54. Accordingly, rotation of the first drive gear 48 will cause linear movement of the first chain member 54, with such linear movement of the first chain member 54 being transferred to the first driven reduction gear 52, thereby causing rotation of the first driven reduction gear 52 in response to rotation of the first drive gear 48. As shown in FIG. 2, first driven reduction gear 52 has a greater diameter than the first drive gear 48, and the first driven reduction gear 52 has a correspondingly greater number of external teeth (not explicitly shown) than the first drive gear 48, with the external teeth meshing with the first chain member 54. Accordingly, the first driven reduction gear 52 rotates at a slower angular velocity than the first drive gear 48, making fewer rotations than the first drive gear 48. The first drive gear 48 and the first driven reduction gear 52 to mesh directly with each other, but are linked via the first chain member. Thus, the first drive gear 48 and the first driven reduction gear 52 rotate in the same rotational direction.

First driven reduction gear 52 is supported for rotation by a shaft 56, wherein shaft 56 also supports a second driven reduction gear 58, which is reduced in diameter relative to first driven reduction gear 52. It is to be recognized that first and second driven reduction gears 52, 58 are supported for conjoint rotation with one another in response to driven rotation of first driven reduction gear 52. Put another way, the first and second driven reduction gears rotate at the same angular velocity, making the same number of turns.

Second driven reduction gear 58 is operably connected with a second drive gear 60 via a second chain member 62. Second drive gear 60 is shown as having a greater diameter than second driven reduction gear 58. Second drive gear 60 is shown as being supported for rotation with a drive shaft 63 of a driven output member, such as a differential 64, by way of example and without limitation, wherein drive shaft 63 is shown in coaxial alignment with output shaft 50 and first drive gear 48, though it is contemplated herein that other arrangements are possible. For example, drive shaft 63 may be offset axially relative to the axis of the output shaft 50. As shown, the axes of rotation of the gears 48, 52, 58, 60 are generally parallel to each other, with the gear pairs being typically co-planar. However, with the output shaft 50 and the drive shaft 63 being separate and not configured for conjoint rotation, the axes of these shafts need not necessary be coaxial. However, a coaxial arrangement may be desirable in some cases.

Second drive gear 60 can be configured to drive differential 64, if desired, which in turn can be configured to drive one of the axles 20, 22.

Also shown with housing 38 is an optional disconnect or park lock 66, which can function to disconnect or lock first driven reduction gear 52 relative to first drive gear 48, and an oil catcher 68.

First chain member 54 and second chain member 62 act to enhance the overall drive efficiency of electric drive module 16, with it being anticipated that the drive efficiency can be as high as 98.5% (or higher). The arrangement of the gears 48, 52, 58, and 60 allows the ultimate rotational output speed of the differential 64 to be reduced along with the output torque to be increased relative to the speed and torque or the output shaft 50 that is driven by the motor 42.

For example, the motor 42 may generate a first rotational speed at the output shaft 50. The output shaft 50 may directly drive the first drive gear 48 at the same first rotational speed. The first drive gear 50 drives the first drive chain 54 a first linear speed corresponding to the diameter of the first driven gear 50.

With the first drive chain 54 being coupled to the first driven gear 52, which has a larger diameter, the transferred linear speed of the chain results in a slower rotational speed of the first driven gear 52. Put another way, the first driven gear 52 rotates a second rotational speed, which is lower than the first rotational speed of the output shaft 50 and the first drive gear 48. Due to this gear reduction, first driven gear 52 generates an increased torque relative to the first drive gear 48.

With the first driven gear 52 having conjoint rotation with the second driven gear 58 via shaft 56, these gears therefore have the same angular speed, and therefore the second driven gear 58 rotates at the second rotational speed described above, which is greater than the first rotational speed of the output shaft 50 and first drive gear 48. Similarly, the increased torque is transferred to the second driven gear 58.

The second drive gear 60 is coupled via the second drive chain 62 to the second driven gear 58, as described above, and has a greater diameter. Accordingly, the second drive gear 60 rotates at a third rotational speed that is less than the first and second rotational speeds. Accordingly, the second drive gear 60 generates a third torque that is larger than the first torque and the second torque.

It will be appreciated that the specific degree of torque multiplication is dependent on the various ratios of the gears, and that different gear ratios and arrangements may produce different degrees of gear reduction and torque multiplication.

The above described four-gear and two-chain arrangement can therefore provide for efficient gear reduction and torque multiple in a limited amount of space with a limited number of components. Such an arrangement can provide significant cost savings at the manufacturer level as well as cost savings and energy efficiency at the consumer level. However, it will be appreciation that further gear reduction and torque multiplication may be provided by adding additional gears and chains. For example, a third pair of gears may be added, such that the second drive gear 60 may be configured for conjoint rotation with a smaller gear, that is coupled via a third chain a larger gear that is coupled to an output shaft.

FIG. 2 illustrates one aspect of relative sizing for the gears. The first drive gear 48 has a first diameter. The first driven gear 52 has a second diameter. The second diameter of the first driven gear 52 is greater than the first diameter. The second driven gear 58 has a third diameter. The third diameter of the second driven gear 58 is smaller than the second diameter of the first driven gear 52. The third diameter of the second driven gear 58 is also smaller than the first diameter of the first drive gear 48. The second drive gear 60 has a fourth diameter. The fourth diameter of the second drive gear 60 is greater than the third diameter of the second driven gear 58. The fourth diameter of the second drive gear 60 is also greater than the second diameter of the first driven gear 52 and the first diameter of the first drive gear 48.

The two-chain and two-gear arrangement described above results in each of the above-described gears rotating in the same rotational direction. Rotation of the first drive gear 48 in a first rotational direction drives the first chain 54 in a first direction. Movement of the first chain 54 in the first direction causes rotation of the first driven gear 52 in the same first rotational direction as the first driven gear 48. The conjoint rotation of the first driven gear 52 and the second driven gear 58 results in the second driven gear 58 rotating in the first rotational direction.

Rotation of the second driven gear 58 in the first rotational direction causes movement of the second chain 62 in the same first direction as the first chain 54. Movement of the second chain 62 in the first direction thereby causes rotation of the second drive gear 60 in the same first rotational direction as the other gears.

Put another way, the above-described gears do not mesh directly with each other, and therefore do not causes opposing rotation at a directly toothed interface.

Each of the above-described gears are offset radially from each other such that that they do not radially overlap or mesh with each other. The first drive gear 48 and the first driven gear 52 may be referred to as a first gear pair. The gears of the first gear pair may be arranged co-planar to accommodate the first chain 54. However, it will be appreciated that these gears may be slightly axially offset.

Similarly, the second driven gear 58 and the second drive gear 60 do not radially overlap and may be referred to as a second gear pair. The gears of the second gear pair may be arranged co-planar to accommodate the second chain 62, but they may also be slightly axially offset.

The first gear pair is axially offset relative to the second gear pair. Each of the gears of each gear pair are spaced away from each and radially offset such that may be operatively coupled via the respective one of the chains 54, 62.

The use of the chains 54, 62 to couple each of the gear pairs allows for the size and arrangement of the gears to be changed or tailored to suit the particular gear reduction and torque multiplication needs of the user. For example, the size of one the gears may be changed, without requiring the size of the other gears to be changed. The chain that corresponds to the differently sized gear may be changed to accommodate the larger or smaller diameter of the differently sized gear. Accordingly, the above-described arrangement can provide a cost effective structure that can be easily modified. This modularity is not possible or can be substantially difficult in direct meshing arrangements between co-planar gears or in the case of helical or bevel gears or worm gears or the like, where changing the size of a gear requires changing the size of a corresponding gear or shifting the axis of rotation of a gear.

Each of the axes described in relation to the EDM 16 are generally axially parallel to each other, and each of the gears and chains are arranged generally parallel to each other, perpendicular to the various axes. Forces and reaction forces generated by the gears are therefore generally constrained to the planes of the gears. Little to no axial forces are generated, as in the case of traditional gearboxes with perpendicularly arranged shafts and rotational axes, which thereby require the use of thrust bearings and the like to counteract the axial forces and keep the gears in their proper position. The above-described gearbox does not require thrust bearings due to the lack of axial forces on the gears, and therefore the EDM 16 can produce improved efficiency and reduced losses due to the lack of thrust bearings.

Thus, the chain drive mechanism eliminates or substantially reduces axial forces, thereby eliminating or reducing torque dependent forces on bearings/housing supporting the gears/shafts. Further yet, the chain members 54, 62 can act as oil pumps to support the lube mechanism within housing 38 and to realize a dry sump arrangement with a dedicated, translation activated oil catcher 68. Prior gearboxes with helical gearing typically utilize a lubrication mechanism with a dedicated lube pump. With the chain members 54, 62 acting as the oil pump to support the lube mechanism of the EDM 16, a dedicated oil pump is not necessary, thereby reducing cost and complexity.

Figure 3:
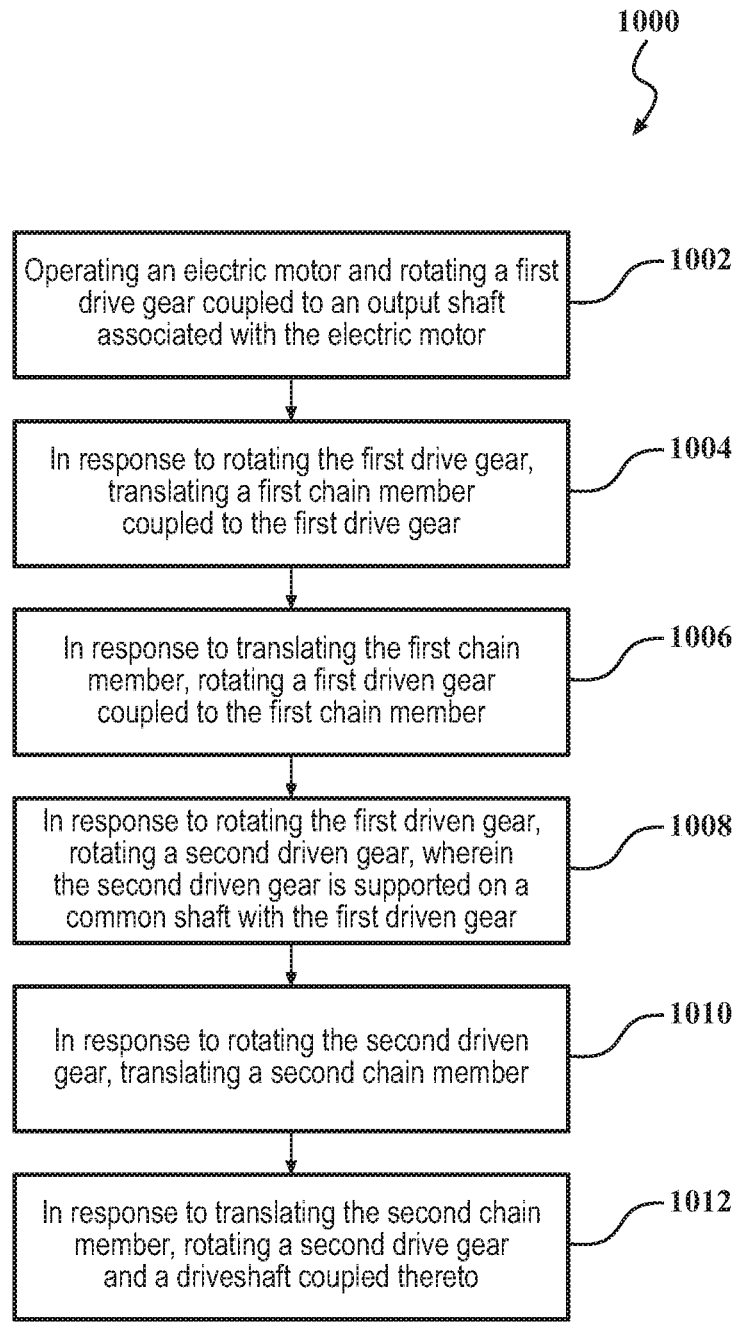
FIG. 3 is an illustration of a method for operating the electric drive module.

Having described the EDM 16 and its various component structure, a method 1000 for operating the EDM 16 will now be described. With reference to FIG. 3, at step 1002, the method includes operating an electric motor and rotating a first drive gear coupled to an output shaft associated with the electric motor. At step 1004, the method includes, in response to rotating the first drive gear, translating a first chain member coupled to the first drive gear. At step 1006, the method includes, in response to translating the first chain member, rotating a first driven gear coupled to the first chain member. At step 1008, the method includes, in response to rotating the first driven gear, rotating a second driven gear, wherein the second driven gear is supported on a common shaft with the first driven gear. At step 1010, in response to rotating the second driven gear, translating a second chain member. At step 1012, the method includes, in response to translating the second chain member, rotating a second drive gear and a driveshaft coupled thereto.

It will be appreciated that there are additional or alternative aspects of the method 1000 that may be applied in accordance with the above-described functionality of the EDM 16 and that the above-described method 1000 shall not be limiting.

The foregoing description of the several embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Those skilled in the art will recognize that concepts disclosed in association with the example electric drive module and chain driven e-drive gearbox thereof can likewise be implemented into systems other than a differential to control one or more operations and/or functions.

What is claimed is:

1. An electric drive module for an electric motor vehicle, comprising:
    a housing defining a chamber;
    an electric motor disposed in the chamber, the electric motor having an output shaft;
    a first drive gear operably driven by the output shaft;
    a first driven gear and a second driven gear supported for co-rotation on a shaft;
    a second drive gear supported for rotation on a drive shaft;
    a first chain member operably coupling the first drive gear to the first driven gear to cause the first driven gear to rotate in response to rotation of the first drive gear;
    a second chain member operably coupling the second driven gear to the second drive gear to cause the second drive gear to rotate in response to rotation of the second driven gear;
    wherein the first driven gear is larger than the first drive gear, the second driven gear is smaller than the first driven gear, and the second drive gear is larger than the second driven gear; and
    wherein the first drive gear is larger than the second driven gear, and the second drive gear is larger than the first driven gear.

2. The electric drive module of claim 1, wherein the first and second driven gears are supported for conjoint rotation with one another.

3. The electric drive module of claim 1, wherein the second drive gear is within a differential.

4. The electric drive module of claim 1, wherein the first drive gear and the first driven gear are spaced apart from each other, and the second driven gear and the second drive gear are spaced apart from each other.

5. The electric drive module of claim 1, wherein the first drive gear, the first driven gear, the second driven gear, and the second drive gear rotate in the same rotational direction.

6. The electric drive module of claim 1, wherein rotational axes of the first drive gear, the first driven gear, the second driven gear, and the second drive gear are parallel to each other.

7. The electric drive module of claim 1, wherein the first drive gear and the second drive gear are co-axial.

8. The electric drive module of claim 1, wherein the first drive gear and the second drive gear are axially offset relative to each other.

9. The electric drive module of claim 1, further comprising a disconnect or park-lock mechanism operatively coupled to the first driven gear.

10. The electric drive module of claim 1, wherein the first drive gear is metal.

11. The electric drive module of claim 1, wherein the first drive gear is plastic.

12. A method of operating an electric drive module, the method comprising the steps of:
    operating an electric motor and rotating a first drive gear coupled to an output shaft associated with the electric motor;
    in response to rotating the first drive gear, translating a first chain member coupled to the first drive gear;
    in response to translating the first chain member, rotating a first driven gear coupled to the first chain member;
    in response to rotating the first driven gear, rotating a second driven gear, wherein the second driven gear is supported on a common shaft with the first driven gear;
    in response to rotating the second driven gear, translating a second chain member; and
    in response to translating the second chain member, rotating a second drive gear and a driveshaft coupled thereto;
    in response to translating the first chain member or the second chain member, providing lubrication via the first chain member or the second chain member from a dedicated translation activated oil catcher;
    wherein the first driven gear is larger than the first drive gear, the second driven gear is smaller than the first driven gear, and the second drive gear is larger than second driven gear, and wherein the first drive gear is larger than the second driven gear, and the second drive gear is larger than the first driven gear.

13. The method of claim 12 further comprising rotating the first drive gear, the first driven gear, the second drive gear, and the second driven gear in the same rotational direction.

14. The method of claim 12 further comprising rotating the first drive gear and the second drive gear on the same axis of rotation.

15. The method of claim 12 further comprising translating the first and second chains in the same direction.

16. The method of claim 12 further comprising rotating the first drive gear, the first driven gear, the second driven gear, and the second drive gear about respective rotational axes that are parallel relative to each other.

17. The method of claim 12 further comprising co-rotating the first driven gear and the second driven gear.

18. An electronic drive module system, the system comprising:
    an electric motor having an output shaft;
    a first drive gear coupled to the output shaft and rotatable with the output shaft;
    a first driven gear coupled to the first drive gear via a first chain member, wherein the first driven gear is larger than the first drive gear;
    a second driven gear coupled to the first driven gear via a common shaft, wherein the second driven gear is smaller than the first driven gear and the first and second driven gears are co-rotatable;
    a second drive gear coupled to the second driven gear via a second chain member;
    a driveshaft coupled to the second drive gear and rotatable with the second drive gear; and
    a translation activated oil catcher associated with at least one of the first chain member or the second chain member, wherein the first and/or second chain members provide lubrication to the system from the oil catcher;

wherein the first driven gear is larger than the first drive gear, the second driven gear is smaller than the first driven gear, and the second drive gear is larger than second driven gear, and wherein the first drive gear is larger than the second driven gear, and the second drive gear is larger than the first driven gear.

\* \* \* \* \*